United States Patent
Aronov et al.

(10) Patent No.: US 9,252,606 B1
(45) Date of Patent: Feb. 2, 2016

(54) DEVICES FOR ADAPTIVE FAST-CHARGING OF MOBILE DEVICES

(71) Applicant: StoreDot Ltd., Herzeliya (IL)

(72) Inventors: Daniel Aronov, Netanya (IL); Leonid Krasovitsky, Rishon LeZion (IL); Maxim Liberman, Haifa (IL); Vadim Sabayev, Rishon LeZion (IL); Leonid Spindler, Kefar Sava (IL)

(73) Assignee: StoreDot Ltd., Herzeliya (IL)

( * ) Notice: Subject to any disclaimer, the term of this patent is extended or adjusted under 35 U.S.C. 154(b) by 0 days.

(21) Appl. No.: 14/582,934

(22) Filed: Dec. 24, 2014

(51) Int. Cl.
H02J 7/00 (2006.01)

(52) U.S. Cl.
CPC ............ H02J 7/0027 (2013.01); H02J 7/0044 (2013.01)

(58) Field of Classification Search
CPC ..... H02J 7/0042; H02J 7/0044; H02J 7/0047; H02J 7/0054; H02J 7/0073; Y02E 60/12; Y02E 60/122; H01M 10/44
USPC .......................................... 320/114, 113, 115
See application file for complete search history.

(56) References Cited

U.S. PATENT DOCUMENTS

| | | | | |
|---|---|---|---|---|
| 3,963,976 A * | 6/1976 | Clark | ............................ | 320/139 |
| 5,283,707 A * | 2/1994 | Conners | ................ | H02H 9/001 |
| | | | | 323/908 |
| 5,396,162 A * | 3/1995 | Brilmyer | ............ | H01M 2/1055 |
| | | | | 320/114 |
| 5,517,434 A * | 5/1996 | Hanson | .................... | B60R 11/02 |
| | | | | 361/679.41 |
| 5,602,455 A * | 2/1997 | Stephens et al. | ............. | 320/106 |
| 5,602,458 A * | 2/1997 | Dowe | ............................ | 396/205 |
| 5,733,674 A * | 3/1998 | Law et al. | .......................... | 429/9 |
| 5,764,026 A * | 6/1998 | Issa | ............................... | 320/104 |
| 5,926,659 A * | 7/1999 | Matsui | ................. | H01H 37/043 |
| | | | | 361/103 |
| 7,179,105 B1 * | 2/2007 | Hung | ............................. | 439/172 |
| 7,627,395 B2 * | 12/2009 | Sadighi | ................. | B25J 9/1692 |
| | | | | 250/559.45 |
| 7,812,771 B2 * | 10/2010 | Greene | .............. | H01M 2/1022 |
| | | | | 343/702 |
| 2009/0102416 A1 * | 4/2009 | Burley | .................. | H01M 10/44 |
| | | | | 320/103 |
| 2009/0179612 A1 * | 7/2009 | Sherman | ............... | G06F 1/1626 |
| | | | | 320/103 |
| 2010/0241181 A1 * | 9/2010 | Savage | .................... | A61N 1/046 |
| | | | | 607/5 |
| 2012/0104994 A1 * | 5/2012 | Esnard-Domerego | | H02J 7/0068 |
| | | | | 320/107 |
| 2012/0142221 A1 * | 6/2012 | Naskali | ........................ | 439/627 |
| 2014/0084846 A1 * | 3/2014 | Berkowitz | ............ | H02J 7/0093 |
| | | | | 320/107 |
| 2014/0111139 A1 * | 4/2014 | Chen et al. | ..................... | 320/107 |
| 2014/0232343 A1 * | 8/2014 | Tadd et al. | ..................... | 320/114 |
| 2014/0340059 A1 * | 11/2014 | Chen | ..................... | H02M 3/156 |
| | | | | 323/271 |

* cited by examiner

Primary Examiner — M'Baye Diao
(74) Attorney, Agent, or Firm — Pearl Cohen Zedek Latzer Baratz LLP

(57) ABSTRACT

The present invention discloses devices, for adaptive fast-charging of mobile devices, including: a charge-delivering device for providing electrical power to a charge-receiving device; and at least one electrical-contact pin for enabling electrical current to be transmitted at an amperage greater than about 5 A to the charge-receiving device. Preferably, the charge-receiving device is selected from the group consisting of: an integral power-source component of a mobile device and a slave battery. Preferably, at least one electrical-contact pin is further configured to transmit the electrical current at an amperage selected from the group consisting of: greater than about 10 A, greater than about 20 A, greater than about 30 A, and greater than about 60 A. Preferably, at least one electrical-contact pin is spring-loaded. Preferably, at least one electrical-contact pin includes protection circuitry for protecting against thermal overloads and short circuits. Preferably, the device charger further includes: a receiving-area holder for properly engaging the charge-receiving device.

11 Claims, 4 Drawing Sheets

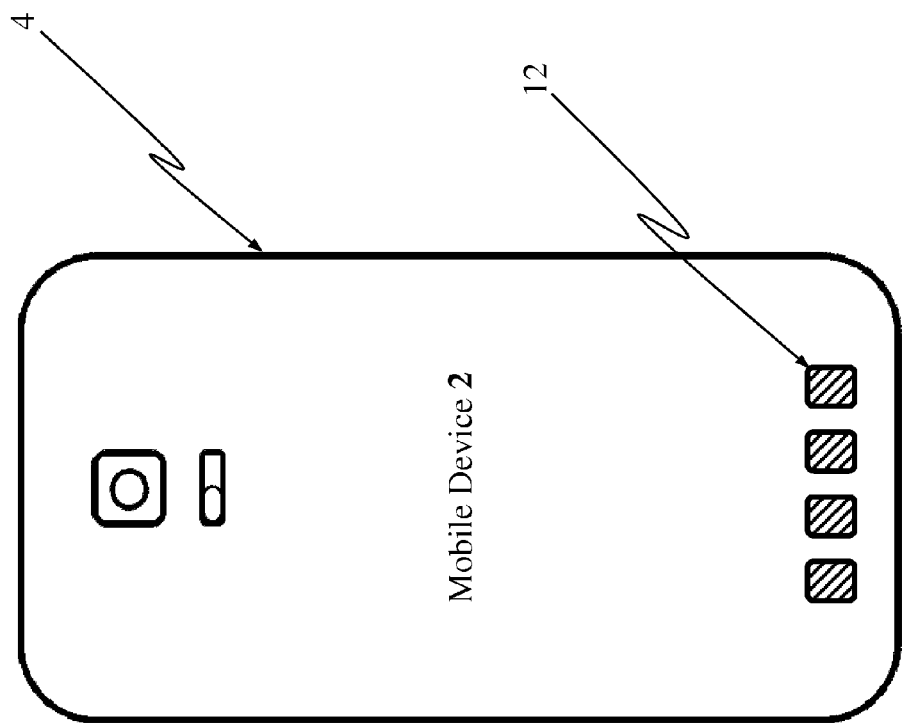

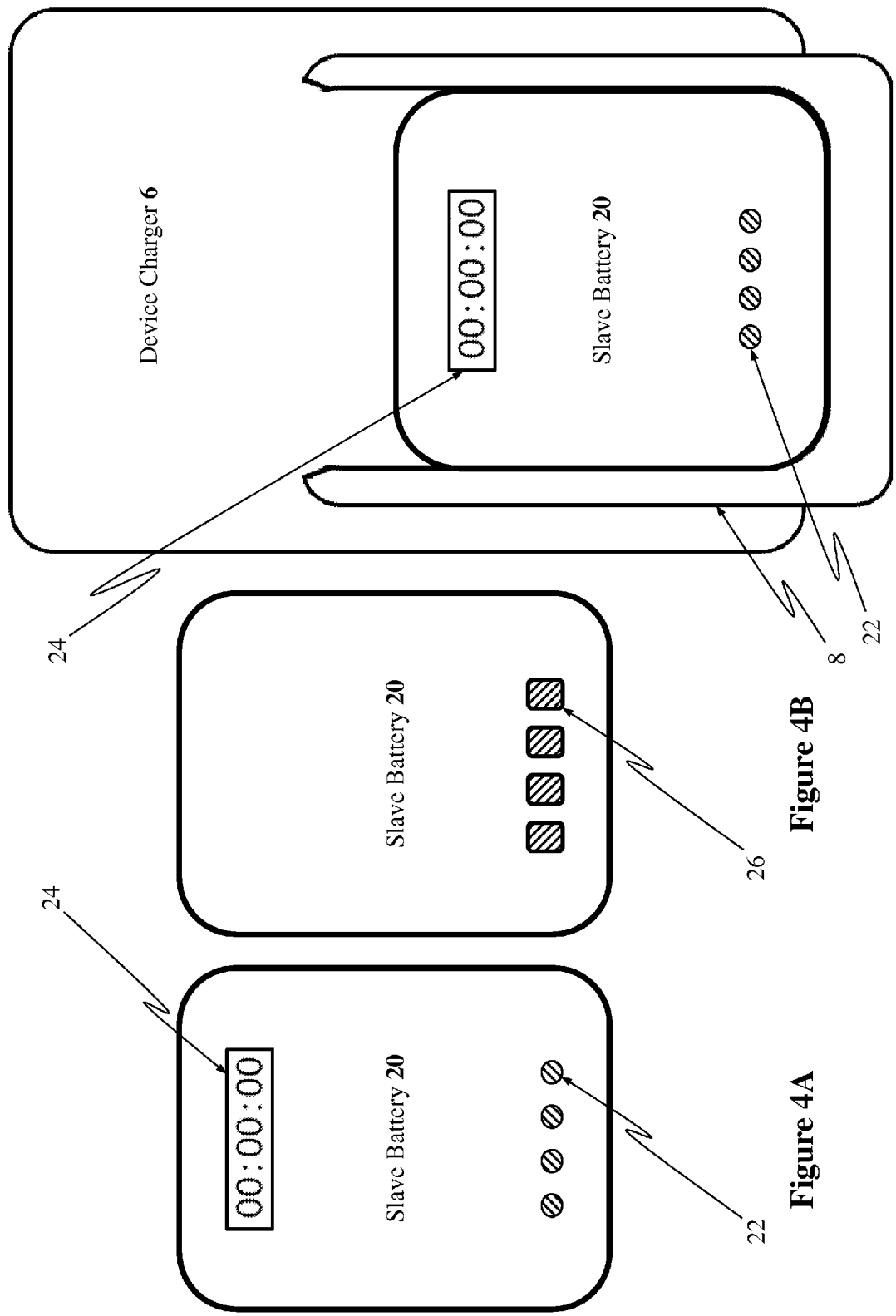

DEVICES FOR ADAPTIVE FAST-CHARGING OF MOBILE DEVICES

FIELD AND BACKGROUND OF THE INVENTION

The present invention relates to devices for adaptive fast-charging of mobile devices.

Modern electronic appliances are becoming ubiquitous for personal as well as business use. It cannot be overstated that with the evolution of such devices, mobility has emerged as a key driver in feature enhancement for technological innovation. While the rapid advancement of low power-consumption processors and flash-memory devices have enabled such mobility to reach new levels of real-world productivity, further development is significantly hampered by the rather slow progress made in battery technology. The proliferation of smart phones, tablets, laptops, ultrabooks, and the like (acquiring smaller and smaller form factors) has made this issue even more abundantly apparent as consumers are eager to have longer and longer device usage times between recharge cycles, without adding heft to the weight and footprint of such devices.

The demands of such applications vary widely, for example, in voltage or power level, but all are preferably served by lightweight, power-storage devices which can rapidly and consistently provide high energy density over long time spans, and can be quickly recharged to operational energy levels. To meet the growing demand in portable electronic device, energy storage devices with high specific energy, high power density, long cycle life, low cost, and a high margin of safety must be employed.

Currently, the dominant energy storage device remains the battery, particularly the lithium-ion battery. Lithium-ion batteries power nearly every portable electronic device, as well as almost every electric car. Batteries store energy electrochemically, in which chemical reactions release electrical carriers that can be extracted into an electrical circuit.

The charge and discharge processes in batteries are slow, and can degrade the chemical compounds inside the battery over time. A key bottleneck in achieving enhanced performance is the limited fast-charging ability of any standard battery. Rapid charging causes accelerated degradation of the battery constituents, as well as a potential fire hazard due to a localized, over-potential build-up and increased heat generation.

Nearly all electronic mobile devices include power connector that receives and provide charging energy. Such electrical connectors are typically configured as female receptacle connectors, and are adapted to be engaged with a male plug connector, such as a USB plug. The plug connector may be at the end of a cable, and plug into an electronic device, thereby forming one or more conductive paths for providing charging energy. Generally, all existing types of connectors only support relatively-low charging current. Today, mobile devices are typically charged via the USB connection, which can supply up to 5 A.

It would be desirable to have devices for adaptive fast-charging of mobile devices. Such devices would, inter alia, overcome the various limitations mentioned above.

SUMMARY

It is the purpose of the present invention to provide devices for adaptive fast-charging of mobile devices.

It is noted that the term "exemplary" is used herein to refer to examples of embodiments and/or implementations, and is not meant to necessarily convey a more-desirable use-case. Similarly, the terms "preferred" and "preferably" are used herein to refer to an example out of an assortment of contemplated embodiments and/or implementations, and is not meant to necessarily convey a more-desirable use-case. Therefore, it is understood from the above that "exemplary" and "preferred" may be applied herein to multiple embodiments and/or implementations.

Preferred embodiments of the present invention enable a system of high-current electrical connectors having target contact "pads" which are located on the charge-receiving devices, and "pins" which are located on charge-delivering devices. The number and location of the pads and pins can be determined by the electrical configuration and requirements desired, and moved freely over the body of the charge-delivering devices and mobile device. Mechanical support is provided by the pad-pin contact junction as well. The charging system supports charging currents above 5 A. Regular electrical connectors cannot be used for such high-current applications because of thermal and electrical limitations. The ability to support very-high charging current can also be provided by implementing more than one pad-pin couple on the charge-receiving devices and charge-delivering devices, respectively.

With such a charging system, electrical connector pads are mounted on the back side of the charge-receiving devices (e.g., mobile devices and slave batteries), while electrical connector pins are mounted on the front side of the charge-delivering devices (e.g., device chargers and slave batteries). Once connector pads and connector pins are properly aligned and contacted, the charging process can be initiated. Proper mechanical contact in the pad-pin couples can be achieved by spring-loading the connector pads and/or pins.

Charge-delivering devices can provide mechanical support for charge-receiving devices. Specific thermal properties of the charge-delivering devices mitigate thermal issues (e.g., electrical losses) during the charging process related to the interface connectors. Mechanical contact between the charge-delivering devices and mobile device can be secured by a special clasp. The charge-delivering devices, in turn, can be mounted to a wall electrical socket or placed on a supporting surface.

Furthermore, for safety protection, the connector pads are recessed into the engagement faces of the charge-receiving devices to prevent direct hand contact. In addition, protection circuitry inside the charge-receiving devices prevents a short circuit from forming between the connector pads.

Features of such adaptive fast-charging devices include, inter alia, the following aspects.

Fast charging with and without an AC or DC power source

Adaptive charging intervals (via control of charging characteristics)

Standard working time

Battery lifetime improvement (via control of charging characteristics)

High current input allowed

Adaptive battery charging by controlling the charging current

Specially-adapted electrical protection for charge-delivering devices and mobile device Therefore, according to the present invention, there is provided a device charger for adaptive fast-charging of mobile devices, the device charger including: (a) a charge-delivering device for providing electrical power to a charge-receiving device; and (b) at least one electrical-contact pin for enabling electrical current to be transmitted at an amperage greater than about 5 A to the charge-receiving device.

Preferably, the charge-delivering device includes a securing clasp for mechanically securing the charge-receiving device when engaged.

Preferably, the charge-receiving device is selected from the group consisting of: an integral power-source component of a mobile device and a slave battery.

Preferably, at least one electrical-contact pin is further configured to transmit the electrical current at an amperage selected from the group consisting of: greater than about 10 A, greater than about 20 A, greater than about 30 A, and greater than about 60 A.

Preferably, at least one electrical-contact pin is spring-loaded.

Preferably, at least one electrical-contact pin includes protection circuitry for protecting against thermal overloads and short circuits.

Preferably, the device charger further includes: (c) a receiving-area holder for properly engaging the charge-receiving device.

Preferably, the charge-delivering device is selected from the group consisting of: an AC device charger, a DC device charger, an AC/DC device charger, and a slave battery.

Preferably, the device charger further includes: (c) at least one electrical-contact pad when the charge-delivering device is a primary slave battery, at least one electrical-contact pad for enabling electrical current to be transmitted at an amperage greater than about 5 A from at least one charge-delivering device selected from the group consisting of: an AC device charger, a DC device charger, an AC/DC charger, and a secondary slave battery.

Most preferably, at least one electrical-contact pad is spring-loaded.

Most preferably, at least one electrical-contact pad is recessed in an engagement face of the primary slave battery.

Most preferably, at least one electrical-contact pad is further configured to transmit the electrical current at an amperage selected from the group consisting of: greater than about 10 A, greater than about 20 A, greater than about 30 A, and greater than about 60 A.

Most preferably, at least one electrical-contact pad includes protection circuitry for protecting against thermal overloads and short circuits.

Most preferably, the primary slave battery includes an informational display.

According to the present invention, there is provided a charge-receiving device for adaptive fast-charging of mobile devices, the charge-receiving device including: (a) an integral power-storage component for storing charge for operation of a mobile device; and (b) at least one electrical-contact pad for enabling electrical current to be transmitted at an amperage greater than about 5 A from a charge-delivering device.

Preferably, the charge-receiving device further includes: (c) a securing clasp for mechanically securing the integral power-storage component to the charge-delivering device when engaged.

Preferably, at least one electrical-contact pad is spring-loaded.

Preferably, at least one electrical-contact pad is recessed in an engagement face of the integral power-storage component.

Preferably, at least one electrical-contact pad is further configured to transmit the electrical current at an amperage selected from the group consisting of: greater than about 10 A, greater than about 20 A, greater than about 30 A, and greater than about 60 A.

Preferably, at least one electrical-contact pad includes protection circuitry for protecting against thermal overloads and short circuits.

More preferably, the integral power-source component is a slave battery.

Most preferably, the slave battery includes an informational display.

These and further embodiments will be apparent from the detailed description that follows.

BRIEF DESCRIPTION OF THE DRAWINGS

The present invention is herein described, by way of example only, with reference to the accompanying drawings, wherein:

FIG. 3 is a simplified back-face view of an exemplary mobile device showing the contact pads for adaptive fast-charging of mobile devices, according to preferred embodiments of the present invention;

FIG. 4A is a simplified front-face view of an exemplary slave battery showing the contact pins for adaptive fast-charging of mobile devices, according to preferred embodiments of the present invention;

FIG. 4B is a simplified back-face view of an exemplary slave battery showing the contact pads for adaptive fast-charging of mobile devices, according to preferred embodiments of the present invention;

FIG. 4C is a simplified front-face view of an exemplary slave battery engaged with an exemplary rapid charger for adaptive fast-charging of mobile devices, according to preferred embodiments of the present invention.

DESCRIPTION OF THE PREFERRED EMBODIMENTS

The present invention relates to devices for adaptive fast-charging of mobile devices. The principles and operation for providing such devices, according to the present invention, may be better understood with reference to the accompanying description and the drawings.

Figure 1:
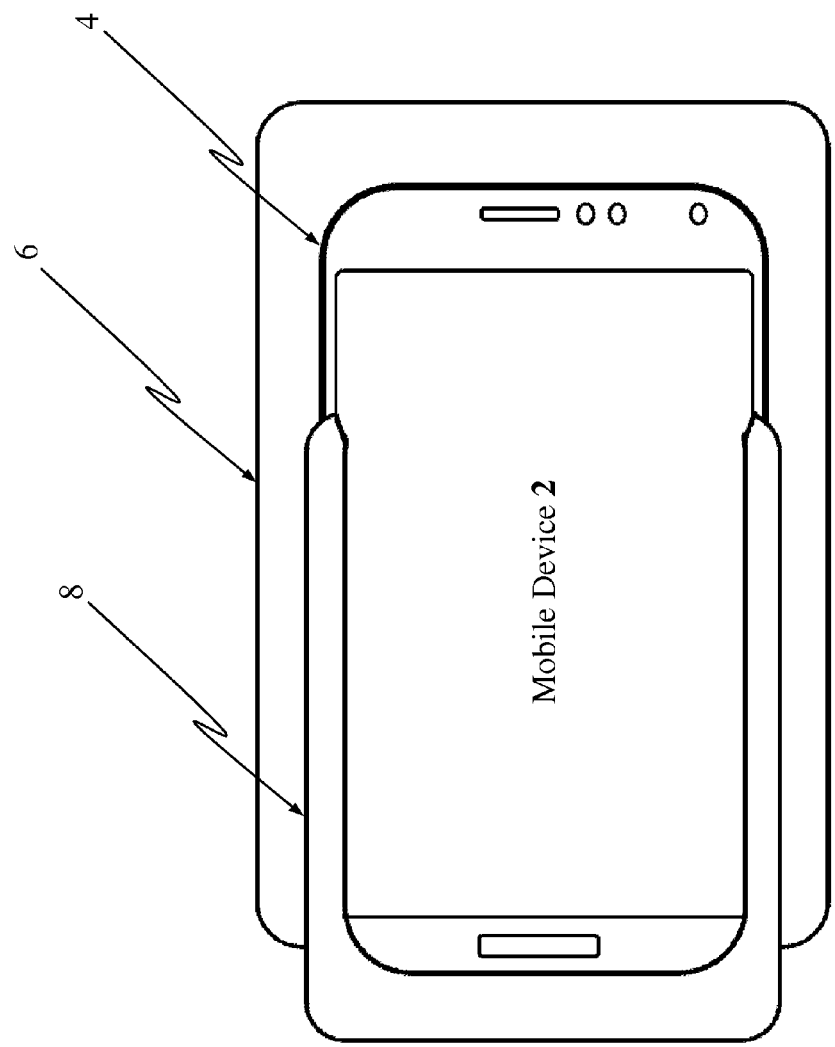
FIG. 1 is a simplified front-face view of an exemplary mobile device engaged with an exemplary rapid charger for adaptive fast-charging of mobile devices, according to preferred embodiments of the present invention.

Referring to the drawings, FIG. 1 is a simplified front-face view of an exemplary mobile device engaged with an exemplary rapid charger for adaptive fast-charging of mobile devices, according to preferred embodiments of the present invention. A mobile device 2 is shown having an exterior profile 4 engaged with a device charger 6 having a receiving-area holder 8 for securely engaging a charge-receiving device, such as mobile device 2 or a slave battery. Specific configurations of the device charger can be adapted to conform mechanically according to the specifications of the model of the mobile device in use. It is understood when referring to mobile device 2, it is intended herein to refer to a mobile device having a power-storage component (e.g., battery) integrated into the mobile device. Thus, charging of mobile device implicitly means charging of such an integral power-storage component.

Figure 2:
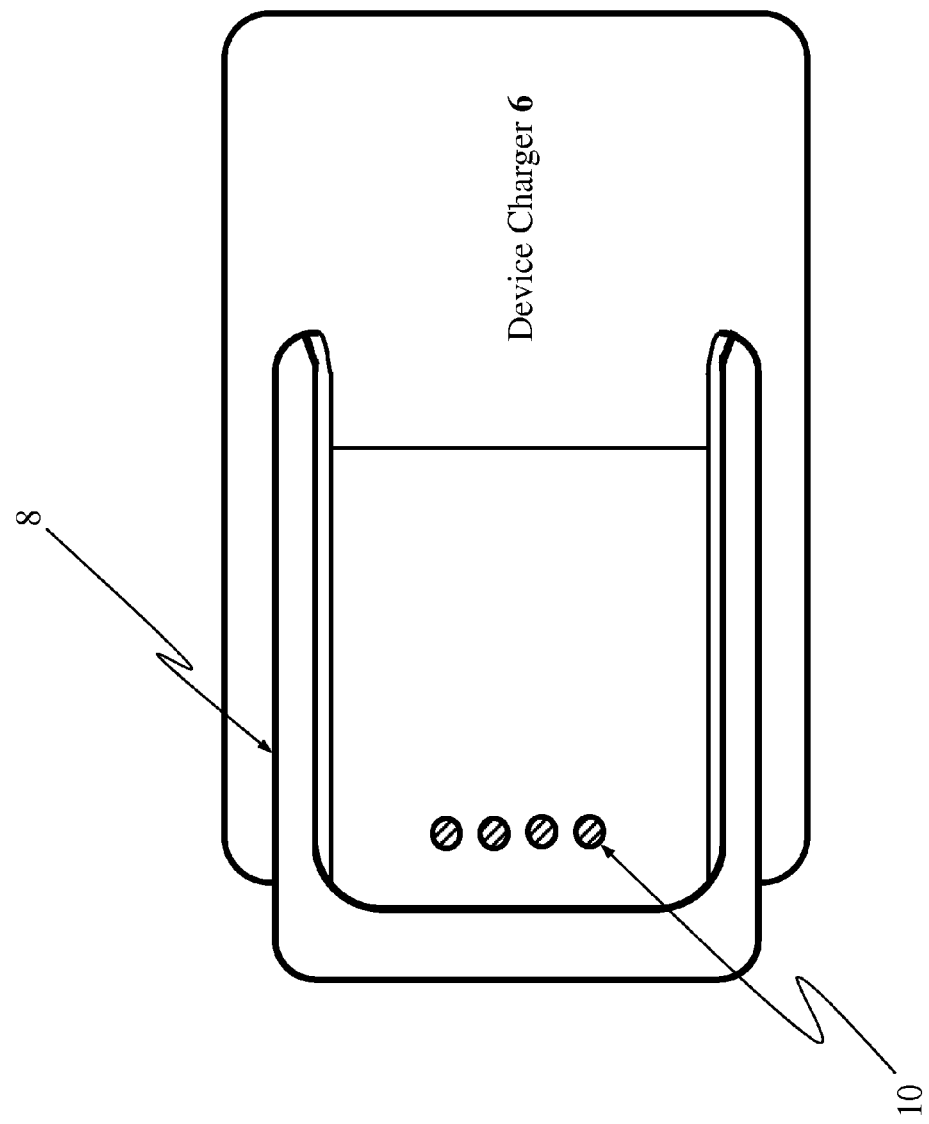
FIG. 2 is a simplified engagement-face view of an exemplary rapid charger showing the contact pins for adaptive fast-charging of mobile devices, according to preferred embodiments of the present invention.

FIG. 2 is a simplified engagement-face view of an exemplary rapid charger showing the contact pins for adaptive fast-charging of mobile devices, according to preferred embodiments of the present invention. Device charger 6 is shown with contact pins 10 exposed with receiving-area holder 8. As mentioned above, such contact pins can be spring-loaded to ensure proper mechanical and electrical contact.

FIG. 3 is a simplified back-face view of an exemplary mobile device showing the contact pads for adaptive fast-charging of mobile devices, according to preferred embodiments of the present invention. Mobile device 2 is shown with exterior profile 4 fully exposed, revealing contact pads 12.

As mentioned above, such contact pads can be spring-loaded to ensure proper mechanical and electrical contact. Contact pads 12 can be recessed into the engagement face of mobile device 2 to prevent direct hand contact. In addition, protection circuitry inside mobile device 2 prevents a short circuit from forming between contact pads 12.

FIG. 4A is a simplified front-face view of an exemplary slave battery showing the contact pins for adaptive fast-charging of mobile devices, according to preferred embodiments of the present invention. The front face of a slave battery 20 is shown having contact pins 22 for engaging the contact pads of a charge-receiving device such as mobile device 2 of FIG. 3. As mentioned above, such contact pins can be spring-loaded to ensure proper mechanical and electrical contact. An optional charge display 24 for displaying remaining charge time or percent charge in slave battery 20 is shown as well.

FIG. 4B is a simplified back-face view of an exemplary slave battery showing the contact pads, respectively, for adaptive fast-charging of mobile devices, according to preferred embodiments of the present invention. The back face of a slave battery 20 is shown having contact pads 26 for engaging the contact pins of a charge-delivering device such as device charger 6 of FIG. 2.

As mentioned above, such contact pads can be spring-loaded to ensure proper mechanical and electrical contact. Contact pads 26 can be recessed into the engagement face of slave battery 20 to prevent direct hand contact. In addition, protection circuitry inside slave battery 20 prevents a short circuit from forming between contact pads 26.

FIG. 4C is a simplified front-face view of an exemplary slave battery engaged with an exemplary rapid charger for adaptive fast-charging of mobile devices, according to preferred embodiments of the present invention. Contact pads 26 (not visible in FIG. 4C) of slave battery 20 are engaged with contact pins 10 of device charger 6 (not visible in FIG. 4C). Contact pins 22 of slave battery 20 are exposed, allowing for further engagement of mobile device 2 (not shown in FIG. 4C) via contact pads 12. Such engagement allows for concurrent charging of mobile device 2 and slave battery 20 while engaged with device charger 6. It is noted that the configuration of slave battery 20 also enables a second slave battery to be used to charge a first slave battery.

The electrical configuration of device charger 6 and slave battery 20 enables a high output current to be transferred to a charge-receiving device (either mobile device 2 or slave battery 20). The pad-pin couples employed in the charging system detailed above can support an electrical current up to about 60 A by using special pad-pin configurations (e.g., 30 A for each pad-pins couple). Generally, it is impossible to conduct currents of such magnitude over regular contacts and wiring. The pad-pin contacts described herein pads are connected to the battery through internal wiring which may include power management and/or protection circuitry specially adapted to the application. Standard connectors can transfer up to 5 A, while allowing data to be transmitted simultaneously as detailed in Table 1 below.

TABLE 1

Electrical current characteristics for charging capabilities of common, standard electrical connectors known in the prior art.

| Specification | Current | | Voltage | | Power | |
|---|---|---|---|---|---|---|
| USB 1.0 | 150 | mA | 5 | V | 0.75 | W |
| USB 2.0 | 500 | mA[a] | 5 | V | 2.5 | W |
| USB 3.0 | 900 | mA[b] | 5 | V | 4.5 | W |
| USB 3.1 | 2 | A | 5 | V | 10 | W |
|  | 5 | A | 12 | V | 60 | W |
|  | 5 | A | 20 | V | 100 | W |
| USB Battery Charging | 0.5-1.5 | A | 5 | V | 2.5-7.5 | W |
| USB Power Delivery | 2 | A | 5 | V | 10 | W |
|  | 3 | A | 12 | V | 36 | W |
|  | 3 | A | 20 | V | 60 | W |
|  | 5 | A | 20 | V | 100 | W |

It is understood that device charger 6 and slave battery 20 can be configured to be compatible with mobile devices that don't allow rapid charging, providing adaptive options to supply standard-current or high-current charging rates, depending on the connected device. Similarly, device charger 6 can be configured to be compatible with slave batteries that don't allow rapid charging, providing adaptive options to supply standard-current or high-current charging rates, depending on the connected device.

While the present invention has been described with respect to a limited number of embodiments, it will be appreciated that many variations, modifications, and other applications of the present invention may be made.

What is claimed is:

1. A device charger for adaptive fast-charging of mobile devices, the device charger comprising:
   (a) a charge-delivering device for providing electrical power between 60 and 100 watts to a charge-receiving device, wherein the charge-delivering device is an AC device charger, a DC device charger, an AC/DC charger, or a secondary slave battery and wherein said charge-receiving device is a primary slave battery;
   (b) at least one electrical-contact pin coupled to the charge-receiving device for enabling electrical current to be received at an amperage greater than about 5 A by said charge-receiving device; and
   (c) at least one electrical-contact pad coupled to the charge-delivering device for enabling electrical current to be transmitted at an amperage greater than about 5 A from the charge-delivering device.

2. The device charger of claim 1, wherein said charge-receiving device is selected from the group consisting of: an integral power-source component of a mobile device and a slave battery.

3. The device charger of claim 1, wherein said at least one electrical-contact pin is further configured to transmit said electrical current at an amperage selected from the group consisting of: greater than about 10 A, greater than about 20 A, greater than about 30 A, and greater than about 60 A.

4. The device charger of claim 1, wherein said at least one electrical-contact pin is spring-loaded.

5. The device charger of claim 1, wherein said at least one electrical-contact pin includes protection circuitry for protecting against thermal overloads and short circuits.

6. The device charger of claim 1, the device charger further comprising:
   (d) a receiving-area holder for properly engaging said charge-receiving device.

7. The device charger of claim 1, wherein said at least one electrical-contact pad is spring-loaded.

8. The device charger of claim 1, wherein said at least one electrical-contact pad is recessed in an engagement face of said primary slave battery.

9. The device charger of claim 1, wherein said at least one electrical-contact pad is further configured to transmit said electrical current at an amperage selected from the group consisting of: greater than about 10 A, greater than about 20 A, greater than about 30 A, and greater than about 60 A.

10. The device charger of claim 1, wherein said at least one electrical-contact pad includes protection circuitry for protecting against thermal overloads and short circuits.

11. The device charger of claim 1, wherein said primary slave battery includes an informational display.

\* \* \* \* \*